United States Patent [19]
Lichti

[11] Patent Number: 4,968,207
[45] Date of Patent: Nov. 6, 1990

[54] ATTACHMENT ACCESSORY FOR MULTI-ACCESS STORAGE SYSTEM

[75] Inventor: Robert D. Lichti, Lake Almanor, Calif.

[73] Assignee: Computer Aided Systems, Inc., Hayward, Calif.

[21] Appl. No.: 159,261

[22] Filed: Feb. 23, 1988

Related U.S. Application Data

[63] Continuation-in-part of Ser. No. 31,989, Mar. 30, 1987, and a continuation-in-part of Ser. No. 732,927, May 13, 1985, abandoned.

[51] Int. Cl.$^5$ ............................................... B65G 1/10
[52] U.S. Cl. ............................... 414/331; 198/803.01; 414/787; 211/122; 211/1.5
[58] Field of Search ................ 198/345, 346.2, 803.01, 198/465.1, 803.2, 803.9; 211/121, 122, 1.5; 414/331, 787, 235, 285, 222; 312/268

[56] References Cited

U.S. PATENT DOCUMENTS

| | | | |
|---|---|---|---|
| 3,785,474 | 1/1974 | Nakamoto | 211/122 X |
| 3,883,203 | 5/1975 | Lexe | 414/787 X |
| 3,902,427 | 9/1975 | Kastenbein | 198/803.01 X |
| 4,033,450 | 7/1977 | Paddock et al. | 198/803.01 |
| 4,547,343 | 10/1985 | Takano et al. | 198/803.01 X |
| 4,561,820 | 12/1985 | Matheny, III et al. | 414/331 |
| 4,574,962 | 3/1986 | Tabler et al. | 211/122 |

*Primary Examiner*—Frank E. Werner
*Attorney, Agent, or Firm*—Flehr, Hohbach, Test, Albritton & Herbert

[57] ABSTRACT

A continuously operating unloading and loading system giving access to an automated multi-level storage conveyor makes use of individual containers adapted to be releasably hooked at established stations of an endlessly traveling rack which may be built in multiple levels. Selected containers are arranged to be called to a selected station, preferably at one end of the rack where, during continuous travel of the rack, an unloading mechanism unhooks the container and moves it to a location clear of the conveyor for disposition of the contents. A reloading mechanism accepts other containers, moves them to a position for replacement on the rack at one of the stations, in which position the container is pushed into hooked engagement with the rack while travel of the rack continues without interruption. Different expedients may be resorted to within the concept of the invention for releasably hooking the containers on the traveling rack.

20 Claims, 11 Drawing Sheets

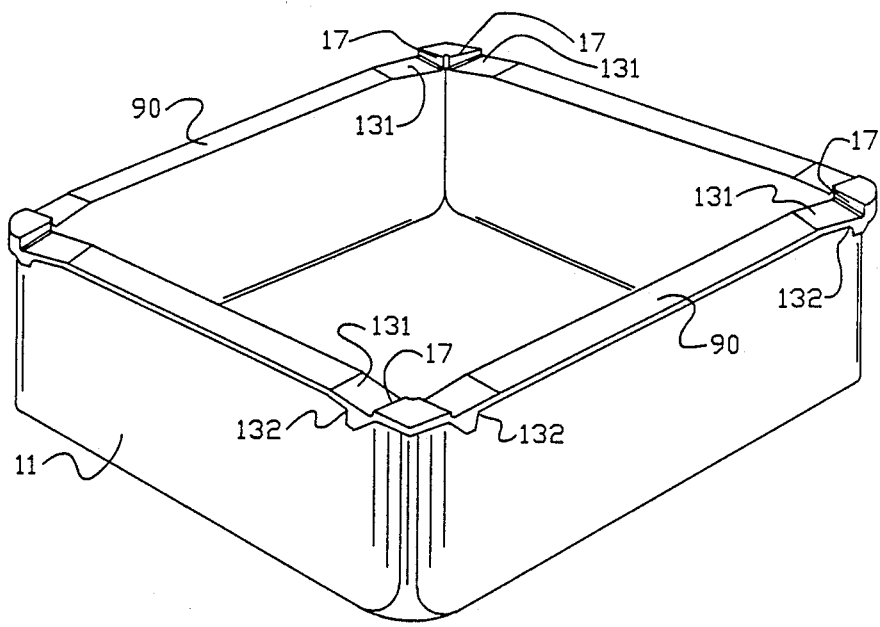
FIG.-15
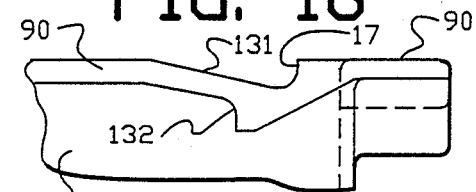
FIG.-16
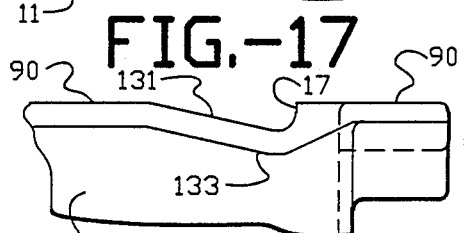
FIG.-17
FIG.-18
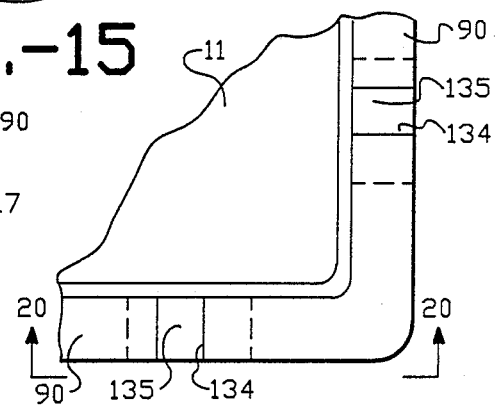
FIG.-19
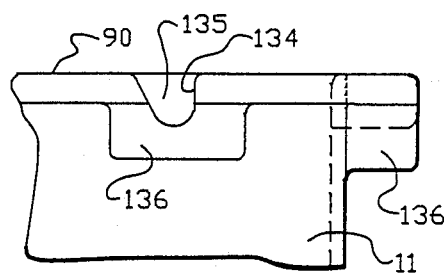
FIG.-20

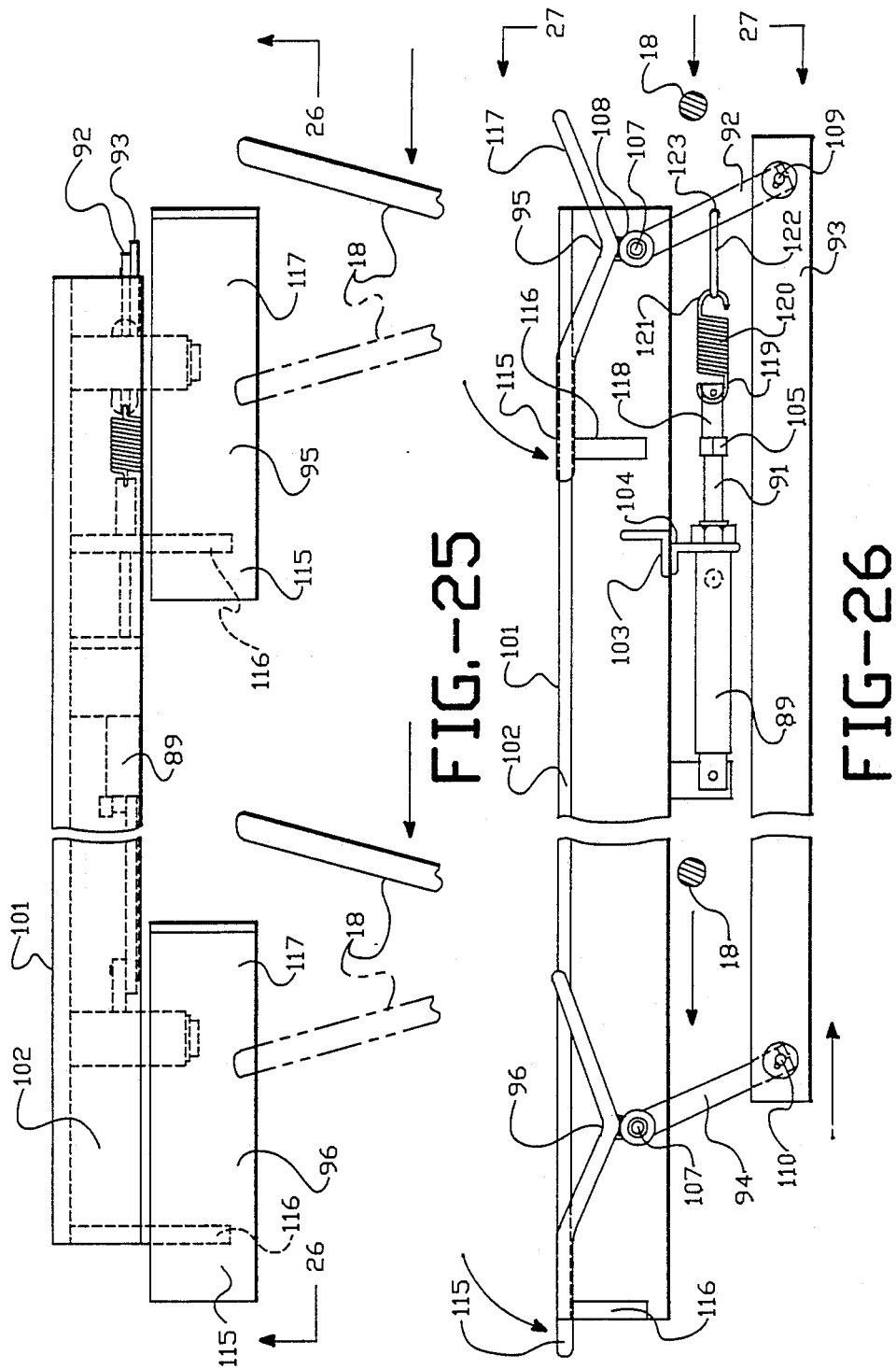

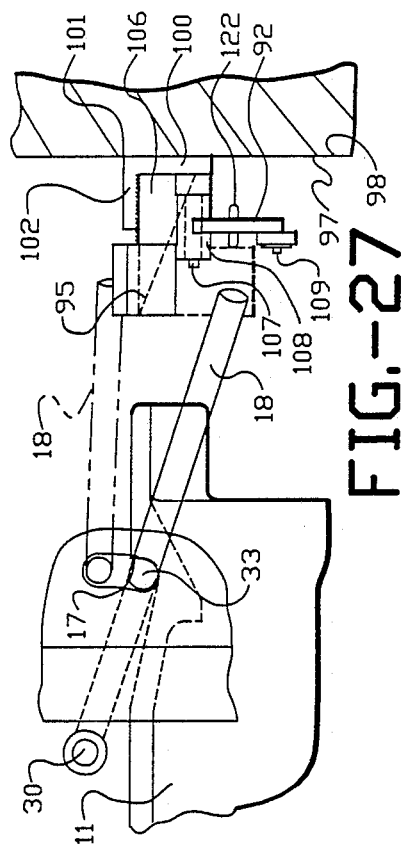
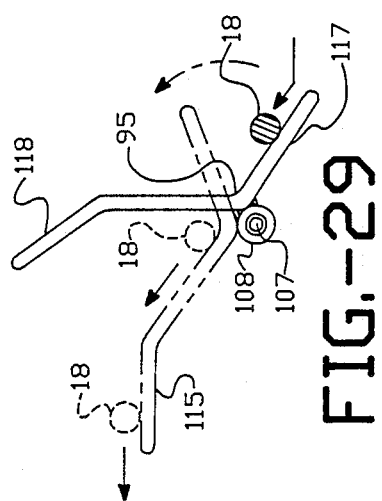
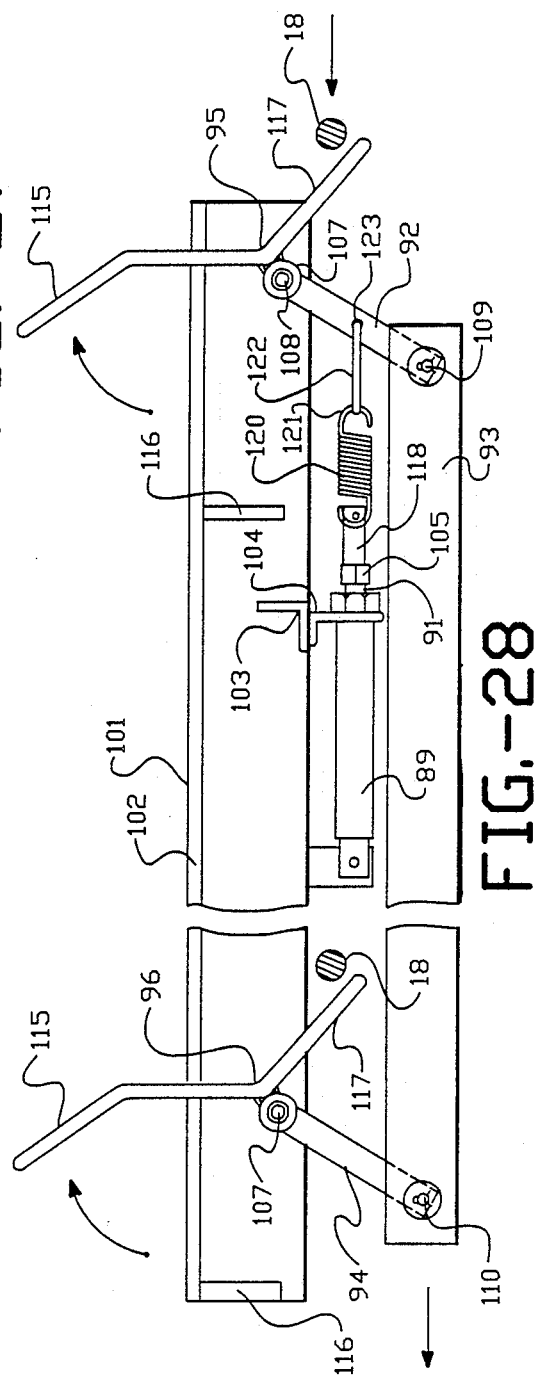
FIG.-27
FIG.-29
FIG.-28

ATTACHMENT ACCESSORY FOR MULTI-ACCESS STORAGE SYSTEM

This is a continuation-in-part of copending application Ser. No. 031,989, filed Mar. 30, 1987, and Ser. No. 732,927, filed May 13, 1985, now abandoned.

In order to meet a progressively increasing need for the storage of hundreds, and in some instances, thousands, of individual articles in a manner suitable for retrieval of any of them by automatic means, there has been an attempt to provide motorized storage racks. The object of motorized racks has been to provide the capability of delivering individual storage containers to an unloading and loading station in response to a computerized call system. Motorized racks of the kind made reference to currently available are exemplified by U.S. Pat. No. 4,422,554.

Although such motorized racks have been a notable advance in identifying and accelerating the delivery of assorted parts from storage, some limitations have been experienced, chief among which has been the need for stopping the rack while a container is being unloaded and continued holding of the rack in stopped position for reloading. The time involved in a procedure of this kind is appreciably exaggerated under circumstances where unloading and loading has to take place at the same location.

Another circumstance adding to the problem is the need to have a constant record kept of the location of containers reloaded on the motorized rack so that they can again be identified accurately when needed. The objectionable time delay becomes exaggerated to a material degree when a multiple number of such motorized racks are stacked one above the other in the interest of taking full advantage of storage space available.

When it is borne in mind that on some occasions containers can be relatively small for the storage of numerous inventory items of especially small dimensions, while on other occasions large containers may be needed to store an adequate number of relatively larger inventory items, the time interval during which the motorized rack must be stopped for unloading and loading can become critical.

It is therefore among the objects of the invention to provide a new and improved multi-access storage system wherein the unloading of containers from the motorized storage conveyor, and subsequent reloading, can take place while the motorized rack continues traveling.

Another object of the invention is to provide a new and improved multi-access storage system capable of unloading and loading containers from a motorized rack which is sufficiently versatile to be applicable to motorized racks of various kinds such as may be currently available.

Still another object of the invention is to provide a new and improved multi-access storage system capable of unloading and loading containers from a moving motorized rack of a character such that it can be made applicable to motorized racks stacked in multiple levels in a storage area.

A further object of the invention is to provide in a multi-access storage system a procedure for extracting, inserting and supporting containers in the system in a manner enabling a thru-put of containers at a rate substantially ten to fifteen times more rapidly than systems heretofore available.

Also included among the objects of the invention is to provide a multi-access storage system capable of unloading and loading operations without need for halting or varying travel of the motorized rack wherein the unloading and loading operation can take place singly or separately at one or both ends or sides of the motorized rack, and whether or not the motorized rack be single or operative on multiple levels.

Further included among the objects of the invention is to provide a new and improved multi-access storage system including a continuous unloading and loading operation capable of being functional while the rack is in motion and being of such character that each container station on the moving rack need be no more than a releasable hook, thereby to avoid structure providing a permanently mounted bin for reception of the respective containers.

Still further among the objects of the invention is to provide a new and improved multi-access storage system wherein the unloading and loading operations are synchronized with respect to motion of a traveling rack in a manner enabling the container to be quickly and dependably unlatched from the moving rack, selectively upon reaching the unloading station, while reloading can be taking place at the same time, if need be, by a synchronized loading mechanism capable of quickly and dependably hooking the container back on the moving rack at whatever empty station may be selected.

The objects, moreover, include provision of such a continuous unloading and loading operation that containers of virtually any capacity or proportion can be accommodated and be of such character that they can be reapplied to the moving rack in various orientations.

With these and other objects in view, the invention consists of the construction, arrangement and combination of the various phases of the device, serving as examples of one or more embodiments of the invention, whereby the objects contemplated are attained, as hereinafter disclosed in the specification and drawings and pointed out in the appended claims.

In the drawings:

FIG. 15 is a side perspective view of one of the material transport units utilized in the form of invention of FIGS. 2-12.

FIG. 16 is a fragmentary plan view of one corner portion of the material transport unit of FIG. 15.

FIG. 17 is a fragmentary elevational view of the corner portion on the line 17—17 of FIG. 16.

FIG. 18 is a fragmentary elevational view of a slightly modified configuration of FIG. 17.

FIG. 19 is a fragmentary plan view of a corner portion of a material transport unit provided with a laterally positioned engagement configuration.

FIG. 20 is an elevational view on the line 20—20 of FIG. 19.

FIG. 25 is a plan view of a modified form of the invention.

FIG. 26 is a side elevational view on the line 26—26 of FIG. 25.

FIG. 27 is an end elevational view on the line 27—27 of FIG. 26.

FIG. 28 is a side elevational view similar to FIG. 26 but with movable parts in a different operational position.

FIG. 29 is a side elevational view of a portion of FIG. 28.

Figure 1:
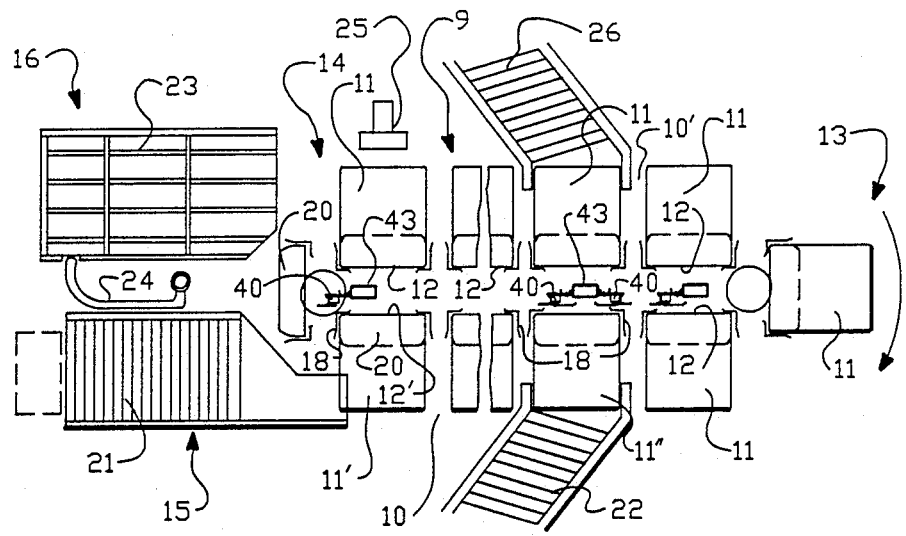
FIG. 1 is a fragmentary diagrammatic plan view drawn to small scale of a multiple motorized storage rack installation illustrating locations at which unloading and loading assemblies may be installed.
Figure 2:
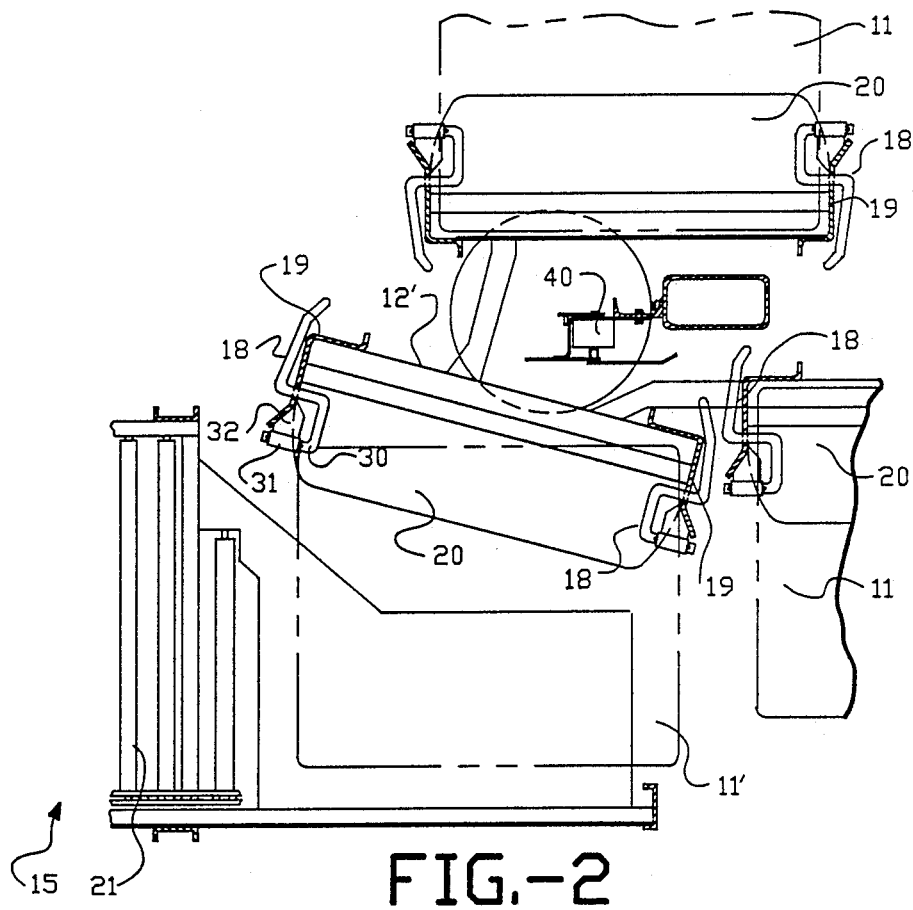
FIG. 2 is a fragmentary plan view of one form of the attachment accessory applicable at an unloading station.

In an embodiment of the invention chosen for the purpose of illustration there is shown in FIG. 1 an endless conveyor rack 9 with oppositely traveling legs 10 and 10' in parallel relationship on each of which is a multiple number of material transport units in the form of containers 11, each container being mounted at its container station 12. The container stations travel between opposite ends 13 and 14. In the embodiment chosen, there is at each end 14 an unloading assembly 15 and a loading assembly 16. It will be appreciated that, space permitting, there can be virtually any number of conveyor racks in side by side relationship and also that racks can be arranged in tiers, one above the other. Further, in the chosen embodiment, it may be assumed that endless conveyor racks 9 are traveling in a clockwise direction and may be so motorized as to be capable of continuous travel at every level. Although, as illustrated, there is a container 11 at every station 12, except the left end station, the conveyor rack is operable in the same fashion, although additional stations might, on occasions, be empty.

Unloading and Reloading

Figure 4:
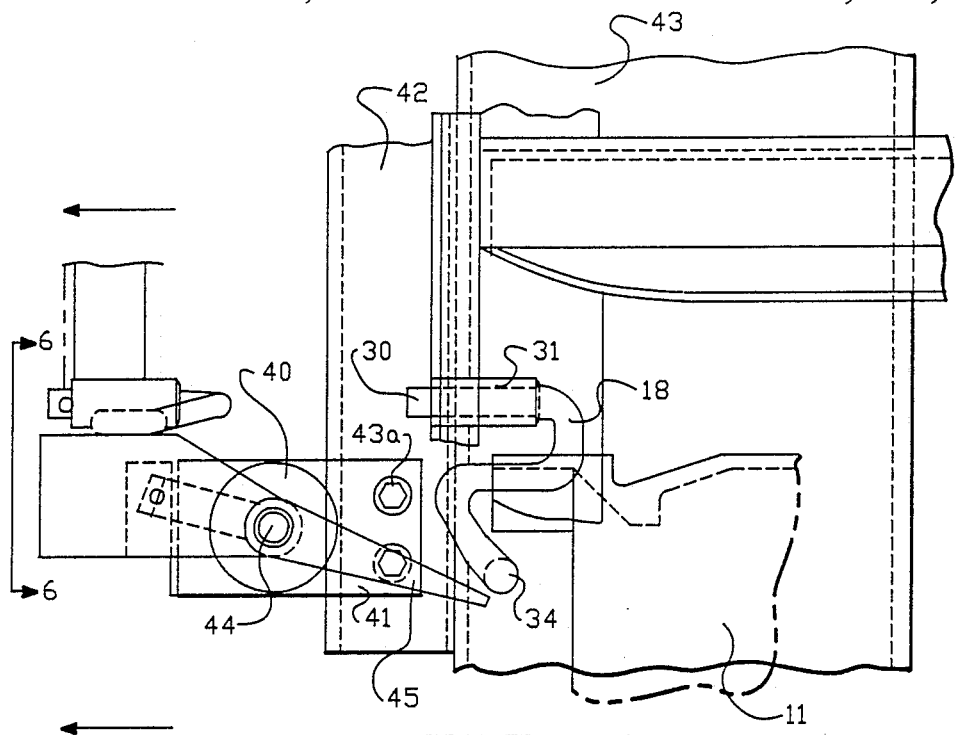
FIG. 4 is a fragmentary elevational view on the line 4—4 of FIG. 3.
Figure 5:
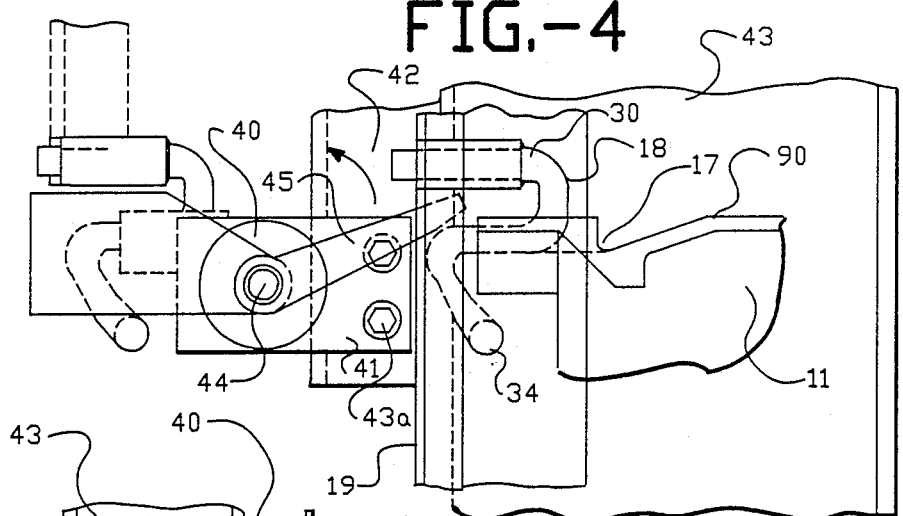
FIG. 5 is a fragmentary elevational view similar to FIG. 4 but showing parts in a different position.
Figure 6:
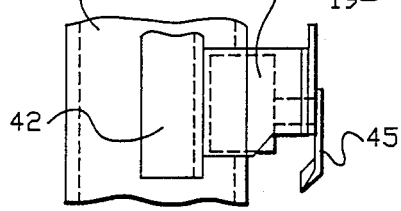
FIG. 6 is a fragmentary elevational view on the line 6—6 of FIG. 4.

For the purpose of illustration, it may be assumed that a container 11' of the leg 10, at the left end station 12', is approaching an unloading operation, referred to also as an extractor operation, to be performed by the adjacent unloading assembly 15. For the unloading operation, it should be understood that the container 11' may be considered as hung on the conveyor rack 9. In the first discussed form of the invention, the hooking expedient employs shoulders 17 of material constituting side walls of the container 11', see FIGS. 3, 4, 5, which are engaged by complementary latch means in the form of hooks 18 mounted on columns of the conveyor. Shelves 20 at the respective stations 12 are for guidance only and not for support of the containers. Although the containers are shown hung on the rack, shelf support for the containers is an acceptable alternative.

For endwise disposal when a container 11' reaches the endmost position, the hooks 18 are disengaged from the shoulders and the unit 11' is pushed off the endless conveyor rack 9 and taken away by a branch disposal conveyor 21.

For lateral disposal when a container 11" reaches a selected position on the leg 10 of the endless conveyor rack 9, the appropriate hooks 18 on both sides of the container are disengaged from the container so that the container can be pushed off the rack and taken away by a disposal conveyor branch 22.

For the reloading operation, referred to also as an inserter operation, containers are reloaded on the opposite side of the conveyor rack 9 after being carried to reloading position by a return conveyor branch 23. By manipulation of the reloading assembly 16, exemplified by an impeller arm 24, functioning as disclosed in application Ser. No. 031,989, filed Mar. 30, 1987. The container is moved to a location opposite the endmost station where, by operation of a transversely acting mechanism 25, it is pushed into a position where the hooks 18 re-engage the shoulders 17 and the unit 11 again, in effect, hung on the conveyor rack 9 as it travels along its path. Reloading can also take place at a selected position on the leg 10' of the conveyor rack 9 by use of a return conveyor branch 26, equipped in a manner similar to the reloading assembly 16.

For a better understanding of the structure and operation of the hooks 18 serving as the latch means in the initially described form of the invention, reference is made to FIGS. 2 through 10, inclusive. The hook 18, roughly in the form of the letter S, has its captive end 30 pivotally retained in a bushing 31 at the end of a flange 32, the flange being mounted by conventional means on the column 19. Intermediate opposite ends of the hook 18 is a transversely disposed latch bar 33 which is adapted to engage the shoulder 17 of the container 11 which serves as the expedient by which the container is in effect hooked on the conveyor rack.

Figure 3:
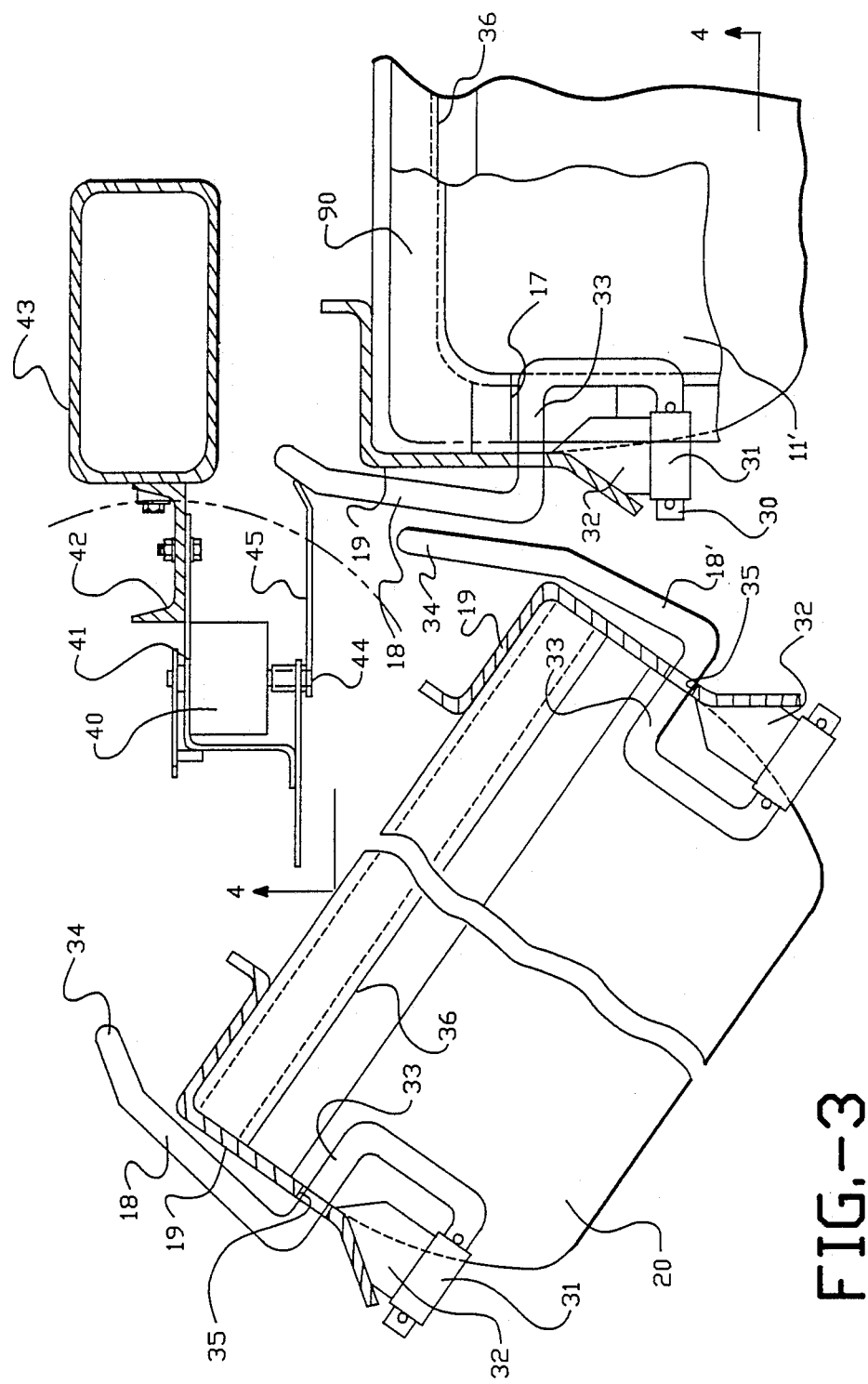
FIG. 3 is a fragmentary plan view to larger scale showing details of the leading corner of the material transport unit and its attachment.

For the purpose of description, the left side of the container 11', as viewed in FIG. 3, may be considered as the leading side and the opposite side as the trailing side. A hook 18' on the trailing side is of substantially the same construction, except for a reversal of position, and in that the hook 18' has a slightly longer free end 34. In the arrangement as shown in FIG. 3, for example, the latch bar 33 also extends through a slot 35 in the column 19 so that as the hook is rotated about its captive end, movement is not restricted throughout the distance necessary to latch and unlatch the container.

So that any one of the four sides of the container 11 may be the side to be in effect hooked on the conveyor rack, shoulders 17, two in number, facing in opposite directions, are provided on each of the four corners of the container. It should further be understood that for the hooking on to be effective, there is provided a stop 36 in a position to be engaged by a bottom portion of the container. The bottom of the inside wall of the container abuts against the stop 36 when the latch bar 33 is in engagement with the shoulder 17 on each occasion.

To disengage the hook 18 on the leading side in order to extract the container from the conveyor rack, power actuated means is employed. In the embodiment of FIGS. 2 through 6, the power means is embodied in a rotating solenoid 40. By means of a bracket 41, the rotating solenoid 40 is attached to a channel section 42 by bolts 43a, the channel section in turn being bolted to a rectangular section of a frame 43 which is embodied in the conveyor rack 9. When a container is to be extracted from the conveyor rack, the rotating solenoid is activated, causing a core shaft 44 to rotate in a clockwise direction, as viewed in FIGS. 4 and 5. Clockwise direction effects rotation of an attached lever 45, moving it to the position of FIG. 4. In that position the lever serves as a cam track when intercepting movement of the hook 18, as the corresponding station of the leg 10 of the conveyor rack advances toward an endmost position. As the hook rides up on the lever 45 in the direction of the arrow of FIG. 4, the hook is rotated about its captive end, lifting the hook far enough so that the latch bar 33 is lifted clear of the shoulder 17, in this way releasing that corner of the container 11', as shown in FIG. 3. Once released, the container is free to and is, in fact, pushed upon the conveyor branch 21 by continued movement of the leg 10 of the conveyor rack, the container being angled outwardly, and by this action, freeing the hook 18' on the trailing side so that the latch bar of the hook 18' is freed from engagement with the corresponding shoulder 17. Thereafter, by action of the conveyor branch 21, the container 11' is disposed of.

On those occasions where the container is to be extracted from a side portion of the leg for disposal by means of the conveyor branch 22, see FIG. 1, both of the hooks 18 and 18', at both the leading side and the trailing side, must be released by appropriate solenoid action in order to have the container 11' disengaged from the corresponding leg 10 of the conveyor rack.

To accommodate those portions of the operation when a container is not to be removed from the conveyor rack, it must remain in its position on the rack as the container passes around the end of the rack from one leg 10 to the other leg 10'. On this occasion, no power is supplied to the solenoid which then maintains the position shown in FIG. 5, namely, its normal position to which it returns automatically when deenergized. In the normal position the lever 45 is lifted clear of engagement with the hook 18, the hook passing beneath the lever and, because of the clearance, the latch bar 33 of the hook remains in engagement with the shoulder 17. Similarly, as the hook 18 on the trailing side likewise has its latch bar 33 remain in engagement with the corresponding shoulder 17, the same clearing effect is experienced for side action extraction as described for extraction at the left end position.

Figure 7:
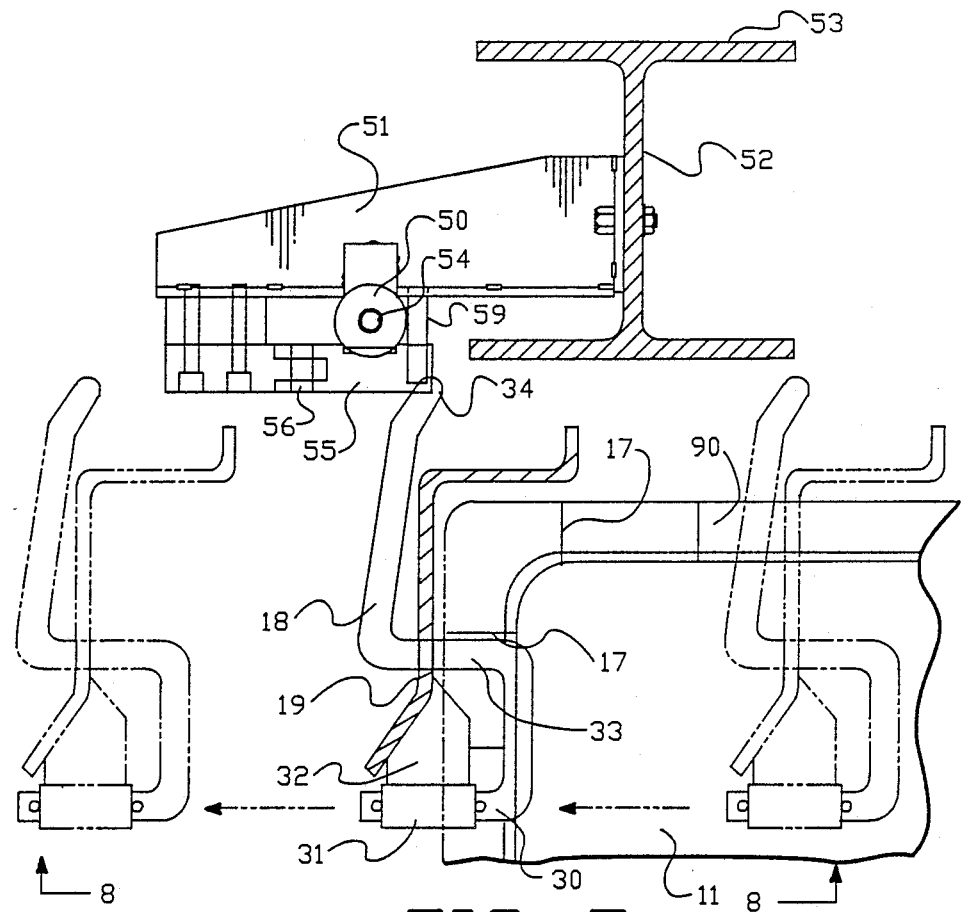
FIG. 7 is a fragmentary plan view of a modified form of power actuated release and showing details of a leading corner of a material transport unit and its attachment.
Figure 8:
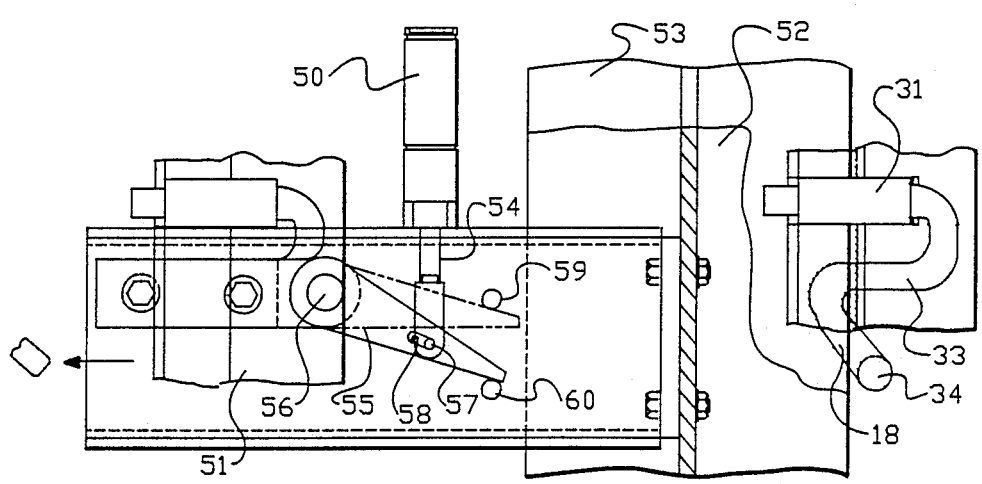
FIG. 8 is a fragmentary elevational view on the line 8—8 of FIG. 7.
Figure 9:
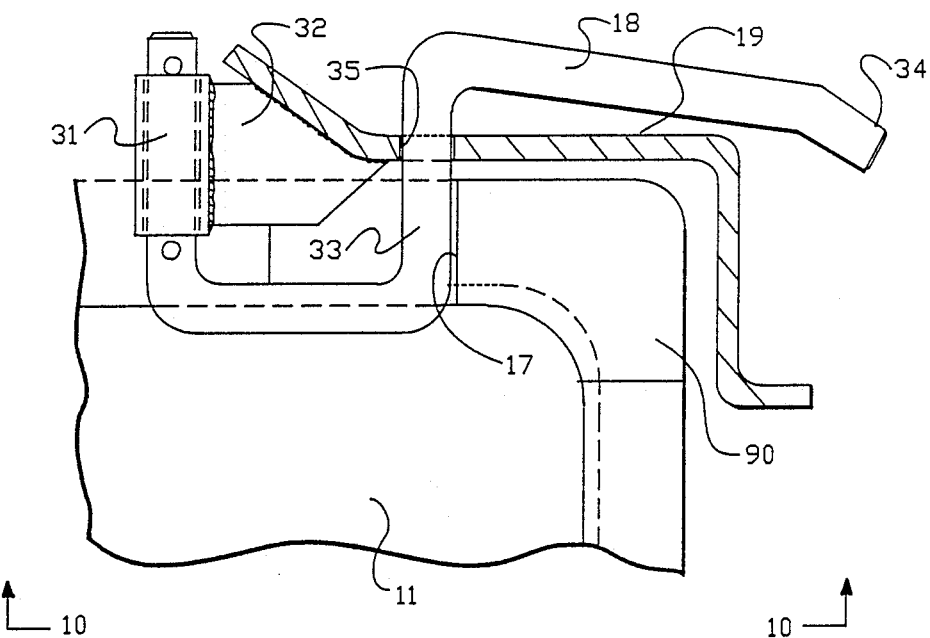
FIG. 9 is a fragmentary plan view of the leading corner attachment of FIG. 7 drawn to a larger scale.
Figure 10:
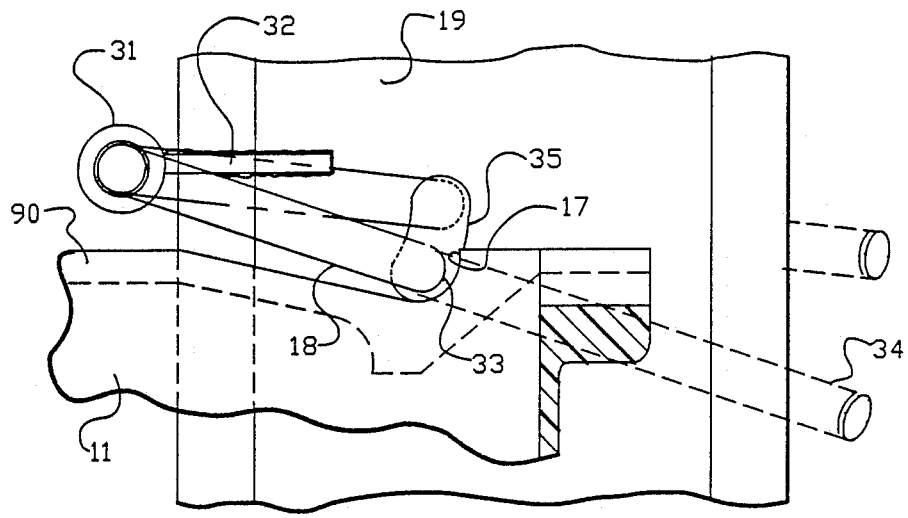
FIG. 10 is a fragmentary elevational view on the line 10—10 of FIG. 9.

For the form of invention of FIGS. 7 and 8, use is made of a linearly acting solenoid 50. On this occasion a bracket 51 is provided, attached as shown, to a rib 52 of a portion 53 of the conveyor rack frame. In this arrangement a core shaft 54 of the solenoid 50 extends downwardly to a position of engagement with a rotating lever 55 which is pivotally mounted by means of a pivot pin 56 on the bracket 51. A stub shaft 57 riding in a slot 58 of the lever 55 provides sufficient freedom of motion so that the lever 55 can be moved by solenoid action between the solid line camming position of FIG. 8 and the broken line clearing position. Stop bars 59 and 60 may be provided, if needed, to limit movement of the lever 55 between the two positions.

As in the previously described form of the device designed for solenoid actuation, for the embodiment of FIGS. 7 and 8 the solenoid is actuated to move the lever 55 downwardly to the solid line camming position when engagement is needed with the hook 18. On this occasion also, the lever serves as a cam track to lift the free end of the hook 18 a distance far enough to have the latch bar 33 clear the corresponding shoulder 17 to effect disengagement. Contrarily when the latch bar is to remain in engagement so that the container is not extracted, the solenoid 50 is deenergized, in which condition the lever 55 remains in the normal broken line position of FIG. 8. In this position the hook 18 clears and its latch bar 33 remains in engagement with the container.

Figure 11:
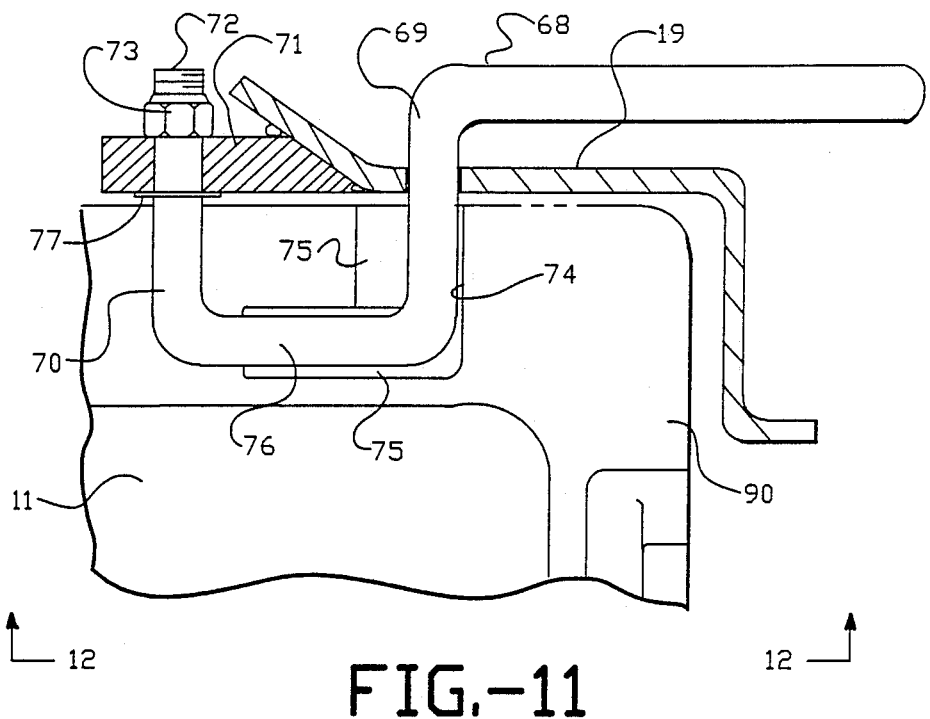
FIG. 11 is a fragmentary plan view of the leading corner of another attachment configuration.
Figure 12:
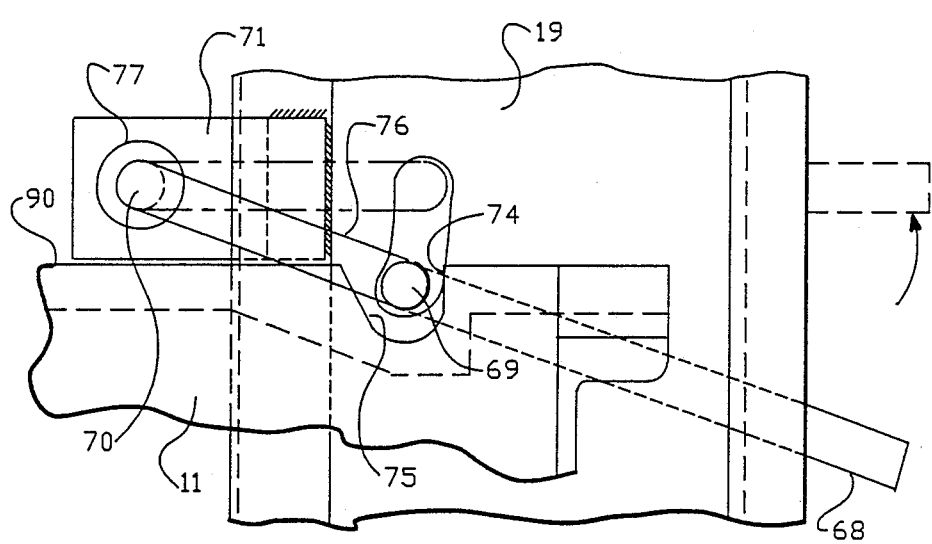
FIG. 12 is a fragmentary elevational view on the line 12—12 of FIG. 11.

In the form of invention of FIGS. 11 and 12, a hook 68, provided with a latch bar 69, has a captive end 70 rotatably mounted in a flange 71 which in turn has a welded connection to the column 19. On this occasion a threaded end 72 is engaged by a nut 73 drawing against a washer 77 in order to fasten the captive end to the flange 71. On this occasion a shoulder 74, provided by a notch 75 at the upper edge of the container 11, provides a means for engagement with the latch bar 69. There is also a notch 75 at the same upper edge of the container to receive a section 76 of the hook 68. The notch arrangement just described serves to preserve greater strength and rigidity for the top edge of the container.

Figure 13:
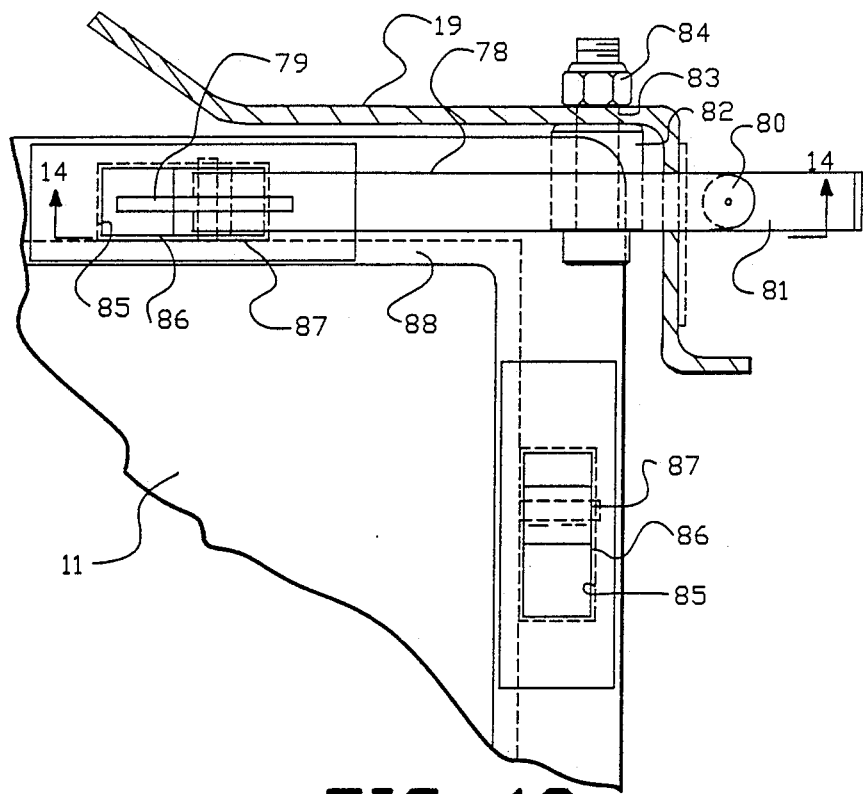
FIG. 13 is a fragmentary plan view of a hooking expedient of modified construction.
Figure 14:
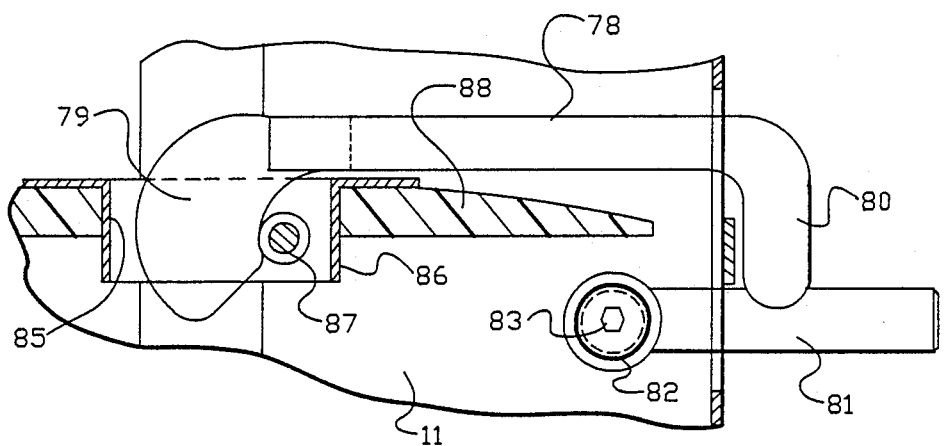
FIG. 14 is a fragmentary cross-sectional view on the line 14—14 of FIG. 13.

In the form of invention of FIGS. 13 and 14, a hook 78 is provided with an enlarged hooked end 79 which is lifted into and out of engagement with the container 11. At the opposite end of the hook 78, there is a bent section 80 in turn attached to a stub shaft 81 which is pivotally secured by means of a sleeve 82 in engagement with a bolt 83. As shown in FIG. 13, the bolt extends through an appropriate hole in the column 19 where it is secured by means of a nut 84.

To accommodate the hooked end 79, the container is provided with an opening 85 at the top edge in which is a liner 86. Transversely disposed in the liner 86 is a pin 87 with which the hooked end actually engages. The pin 87 accordingly serves the same purpose as the shoulder previously described in other forms of the invention. Also, as in the other forms, there are two such shoulder arrangements provided by the pin 87 at each corner of the container 11. A reinforced rim 88 of the container adds to the rigidity of the construction.

For some occasions, especially those where it is desirable to extract a container 11 from a side portion of the leg 10 of the conveyor, as suggested in FIG. 1, resort may be had to a further modified form of the invention, as shown in FIGS. 25 through 29. In this form there is a single source of motor power exemplified by an air cylinder 89. Although an air cylinder is disclosed, other motor means may be resorted to as, for example, a hydraulic ram or a solenoid capable of providing linear movement to a shaft exemplified by a piston 91.

The piston 91, by acting on a lever 92, an interconnecting bar 93, and a comparable lever 94, serve to simultaneously operate both of two camming bars 95 and 96. It may be assumed that the camming bar 95 is for the trailing side of the container 11 and the camming bar 96 for the leading side. The form and operation of the camming bars 95 and 96 are such that they function comparably for all previously described hook means as, for example, the hooks 18 of FIGS. 4 through 10, the hooks 68 of FIGS. 11 and 12, and the hooks 78 of FIGS. 13 and 14. The hooks 18 are used in the example described.

In the form of invention of FIGS. 25 through 29 the air cylinder 89 and camming bars 95 and 96 are mounted on the same face 97 of a column 98 at a selected level of the conveyor rack 9. One leg 100 of a horizontally disposed angle section 101 is secred by conventional means to the column 98 with the other leg 102 extending outwardly. A short outwardly directed angle section 103 supports a foot bracket 104 to which the cylinder is attached by use of a mounting nut 105.

Both camming bars 95 and 96 are similarly mounted on the face of the column 98. A description of one should therefore be adequate for both. There is a plate 106 secured to the leg 100 from which extends a stub shaft 107. Pivotally mounted on the stub shaft 107 is a bushing 108 from which extends a lever 92 or 94, as the case may be. There is a clevis pin 109 interconnecting a free end of the lever 92 with a corresponding end of the connecting bar 93. For the lever 94 there is a clevis pin 110 interconnecting the lever 94 with the adjacent opposite end of the connecting bar 93. A parallelogram of action is in this way provided.

Attached also to the bushing 108, as for example by a weldment, is the camming bar 95. In the solid line position of FIGS. 25, 26, an arm 115 of the camming bar rests upon a bracket 116. The bracket, being stationarily mounted on the column 98, limits counterclockwise rotation of the camming bar 95, as shown in FIG. 26. In the solid line normal position as shown, an opposite arm 117 of the camming bar is shown lifted to a position above the free end of the hook 18 when the is in engagement with the container 11 (see FIG. 27). The same condition is true also of the camming bar 96. Consequently, the position of the container on the conveyor rack will continue undisturbed as it passes the column 98.

When a container 11 is to be disengaged for extraction from the conveyor, the latch bar 33 of the hook 18 on both the leading side and the trailing side of the container need be released from engagement with corresponding shoulders 17. For side extraction from the conveyor, release of both should preferably take place at the same time. This may be accomplished by the mechanism of FIGS. 25 through 29.

For unlatching to be accomplished, both camming bars need to be rotated clockwise from the solid line position shown to a position corresponding to the broken line. Rotation is accomplished by action of a motor means exemplified by the air cylinder 89. To link the air cylinder to the camming bars, a clevis 118 is attached to the free end of the piston 91. Attached to the clevis is an end loop 119 of a coil spring 120. An end loop 121 at the opposite end is engaged by one end of an S hook 122, the opposite end of which extends through a hole 123 located between opposite ends of the lever 92.

Because of the linkage already described, only the lever 92 needs to be directly driven, the lever 94 being simultaneously motivated by the interconnecting bar 93. As the air cylinder moves its piston 91 from right to left, the camming bars 95, 96 are both rotated in a clockwise direction to the solid line unlatch position of FIG. 28 where they lie in the path of travel of free ends of the hooks 18. Activation of the air cylinder is timed to occur during approach of the container to the extractor location and prior to arrival.

When the free end of the hook 18 engages the camming bar 95 and commences to ride up the slope of the bar, see FIG. 29, the corresponding latch bar 33 is progressively lifted clear of shoulder 17 and the container is thus disengaged. By virtue of the linkage, this occurs on both the leading and trailing sides at the same time.

After disengagement, the latch bar continues to travel upwardly of the camming bar in each case along its arcuate mid-portion to a location above the axis of rotation of the bushing 108. Once past that point, the latch bar exerts pressure on the camming bar, causing it to rotate in a counterclockwise direction. By the time the latch bar is clear of engagement with the lever 92 or 94, as the case may be, the end of the arm 115 engages the bracket 116 at the limit of its counterclockwise rotation. During this part of the operation, the lever 92 also is moved counterclockwise to normal position which it is permitted to do extension of the coil spring 120, even though the air cylinder 89 may not have as yet released the piston 91.

Having cleared the free ends of arms 115 of the camming bars 95, 96, the hooks 18 are free to fall again to normal position, ready to engage shoulders 17 of the next container 11 which is inserted at the corresponding station during an insertion operation of the kind heretofore disclosed.

With a sequence of operation of the kind made reference to, shold there be an inadvertent power failure to the air cylinder or other type of motor where such be relied upon, containers would hold their places on the several stations of the conveyor until power to release them has been restored.

Further still, by having the arms 115 longer or, in the alternative, more heavily loaded, than the arms 117, the levers 95 and 96 will automatically return to normal position should there be a break in the linkage, and in that way avoid inadvertent extraction of containers 11 from the conveyor 9.

A singular advantage inherent in an extractor of the type disclosed in FIGS. 25 through 29 is that of making it possible to extract containers at any level of the conveyor 9 and at either side or either end. This capability makes possible adapting the conveyor to a security type of storage and retrieval. Security type containers can be, if desired, confined to selected levels of the conveyor. From secured storage retrieval can be confined to only a secure disposal system. The inserter system can be comparably reserved for only one of a secure character.

By making the containers 11 of a molded fiberglass reinforced resin material, the containers, and more particularly upper rims 90, may be modified at the corners to provide a variety of shoulder expedients to accommodate different circumstances. For example, the container 11 heretofore disclosed as provided with a pair of shoulders 17 at each of the upper four corners is shown in FIG. 15 being formed by a graduated depression 131. The container may also be provided with an oppositely facing shoulder 132 on the underside. A shoulder in that position lends itself to what may be described as a cantilever support on those occasions where the conveyor rack is equipped with pegs, as disclosed in copending application Ser. No. 031,989, filed March 30, 1987. In the asbsence of need for shoulders 132, a modified corner 133 may be provided, as shown in FIG. 18.

For those occasions where there is no need for a graduated ddepression 131 to accommodate part of the hook, a shoulder 134, as in FIGS. 19 and 20, may be formed by employment of a relatively deep pocket 135. Since the depth of the pocket 135 is greater than the thickness of the upper rim 90, a mass 136 of extra container material may be provided to accommodate the lower portion of the pocket 135.

On other occasions, and especially those occasions where the latch means is for engagement with the trailing side of a container 11, resilient hooks 137 and 138 may be resorted to for engagement with a shoulder 139 at the location of a side wall 140 of the container, below the rim 141. For the form of invention of FIG. 21, the resilient hook 137 may be of inherently resilient material, anchored to the column 19 by means of rivets 150 at the captive end. The free end is provided with a projection 132 which extends through a hole 147 in the column 19 for engagement with the shoulder 139.

Figures 21, 23:
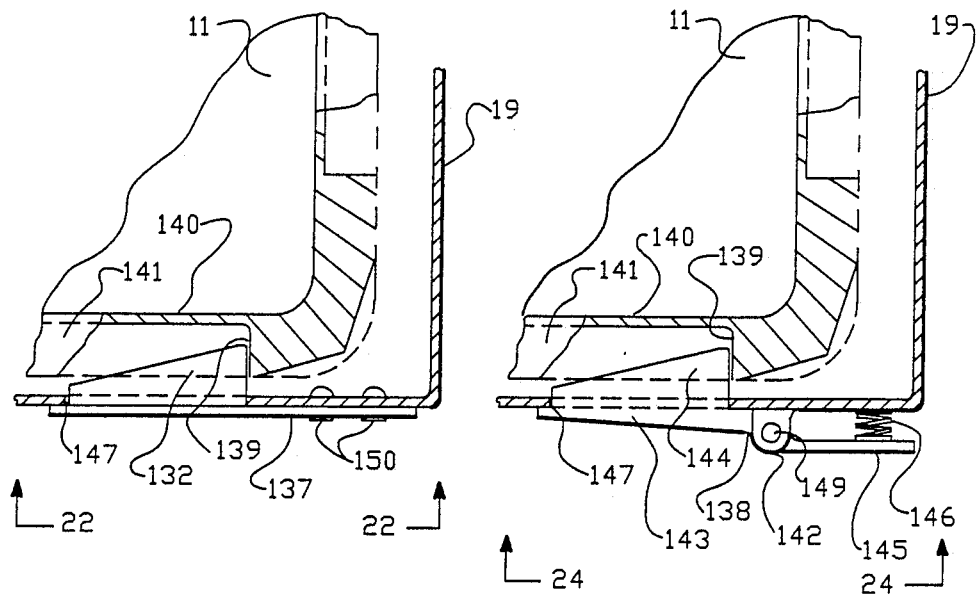
FIG. 21 is a fragmentary plan view of a corner portion of a material transport unit partially broken away showing a laterally disposed resilient hook.
FIG. 23 is a fragmentary plan view similar to FIG. 21 showing a different spring expedient.
Figures 22, 24:
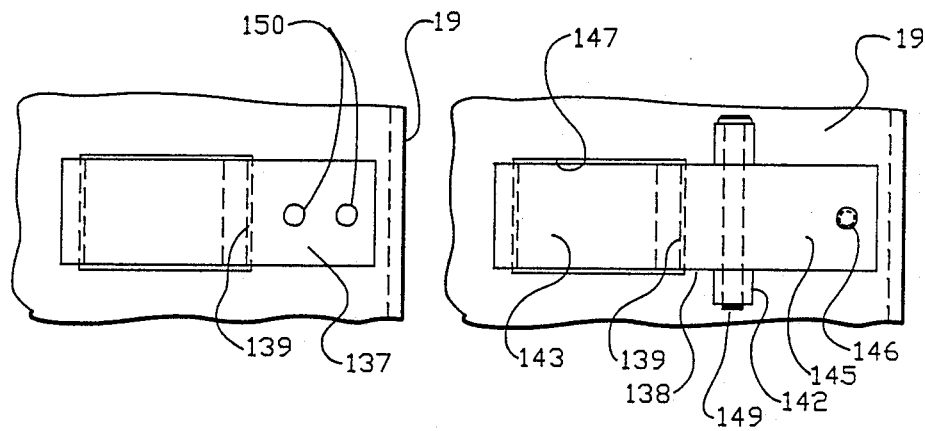
FIG. 22 is a side elevational view on the line 22—22 of FIG. 21.
FIG. 24 is a side elevational view on the line 24—24 of FIG. 23.

The resilient hook 138 of FIGS. 23 and 24 pivots as a first class lever about a pin 149 serving as a fulcrum on a bracket 142, mounted in turn on a side of the column 19. One lever arm 143 has on it a projection 144 which also projects through the hole 147 for engagement with the shoulder 139. The lever arm 144 on the other side of the bracket is resilient urged outwardly by means of a spring 146 to a position where the projection is in engagement with the shoulder.

Referring once again to the reloading or insertion procedure heretofore described, the container 11 is hung in proper position at an empty station, identified in part by the corresponding shelf 20 of the conveyor rack which hasd been provided for it. The transversely acting mechanism 25 is then withdrawn by reverse action so as to be receptive of the next container 11 which becomes moved to reloading position for a succeeding empty station.

In the embodiments of the invention herein disclosed shoulders 17 and hooks 18 have been relied upon as a simple effective expedient for attaching the container 11 to the rack at the proper location. It should be appreciated that what is important to the invention is to have the attachment a releasable attachment, irrespective of the expedient chosen. Various alternatives may be preferred as, for example, making use of pegs and flanges as in the parent application. Another alternative is one in which a movable hook may be employed on the conveyor rack to releasably engage an appropriate laterally open hole at the side of the container, or other comparable structure on the container.

It should be borne in mind in connection with the operation for loading just described that the conveyor rack and all of its stations are continuously moving, first alone one leg to the unloading assembly, then around the end of the conveyor rack to the reloading assembly, and thereafter immediately in a direction fom left to right along the corresponding leg of the rack. The container arrives at the reloading position in advance of arrival of the empty station by a sufficiently brief time span to make certain that there is proper alignment when the mechanism 25 is triggered to push the container into the station and engage the hooks 18 with the shoulders 17. It should be appreciated in this context that when the container arrives at the reloading position, the inside edge of the container is only a short distance from the conveyor rack so that the distance can be immediately closed and engagement accomplished in a very brief span of time.

Although reference has been made to the containers 11 in a manner directing attention to the rim of the container as being provided with shoulders 17, it shold be noted that comparable shoulders are also provided at outside ends of the side walls and at opposite ends of both the front wall and back wall of the container. Having the container equipped in this fashion with multiple sets of shoulders, a square container can be loaded on and carried by appropriate stations of the conveyor rack in any one of four orientations, since all shoulders 17 will be engaged by the hooks 18 in the same fashion. The shoulders as shown are located adjacent the rim 90 which extends around the top of the container.

While particular embodiments of the present invention have been shown and described, it will be obvious to those skilled in the art that further changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is as follows:

1. A multi-access storage system comprising:
   an endless conveyor rack having a multiple number of stations and mounted for movement along paths of travel between opposite ends;
   conveyor engagements means at each of said stations, said stations and engagement means having leading and trailing sides relative to the direction of travel of said stations;
   a multiplicity of material transport units formed of bottom and peripheral enclosing sides, the units including an upper peripheral rim surface having a sholder formed therein along their respective leading and trailing sides, each shoulder for releasable engagement with said conveyor engagement means, said conveyor engagement means comprising articulated members positioned at the leading and trailing sides of each station, the articulated members each being installed and mountd to its associated rack station for releasable engagement with said respective shoulders; and
   an unloading assembly adjacent said rack for unloading said material transport units from the rack, said unloading assembly comprising disengagement means for disengaging the articulated members from their associated shoulders on said material transport units to allow the units to be taken away from the rack.

2. A multi-access storage system as in claim 1 wherein said shoulder comprises a recess on a side wall of the unit.

3. A multi-access storage system as in claim 1 wherein said shoulder is formed by a hole in the top edge of the unit, a liner in th hole and a transversely extending shoulder element in said hole.

4. A multi-access storage system as in claim 1 wherein said unloading assembly is at a first end of said conveyor rack.

5. A multi-access storage system as in claim 1 wherein said unloading assembly is at an intermediate position between the opposite ends of said conveyor rack.

6. A multi-access storage system as in claim 1 wherein said disengagement means comprises a power actuated member at both the leading side and the trailing side of said material transport unit for release of both of said articulated members.

7. A multi-access storage system as in claim 1 wherein each said articulated member comprises:
   a captive section that is pivotally attached to the associated rack station;
   and a working section that is subject to movement between a position of engagement with a particular shoulder of an associated material transport unit and a position for disengagement from the particular shoulder in response to a work force.

8. A multi-access storage system as in claim 7 wherein said respective articulated members have the form of a lever wherein:
   the movable attachment of the captive section is a pivot joint; and
   the working section has an intermediate configuration for engagement with the particular associated shoulder and free end section responsive to said work force.

9. A multi-access storage system as in claim 7 wherein said articulated member comprises a lever arm having a pivot engagement with the rack at as fulcrum, a spring actuated end on one side of the fulcrum and a hooking end extending from the fulcrum movable between positions of engagement with and disengagement from the particular shoulder of the associated material transport unit in response to action of said spring actuated end.

10. A multi-access storage system as in claim 7 wherein said disengagement means comprises a power actuated member having a driven element and a diverter movable between a position of operative engagement with an articulated member and a position free of engagement with the articulated member, said articulated member in a first of said positions being in engagement with the particular shoulder on the associatd material transport unit and in a second of said positions being free of engagement with the particular shoulder.

11. A multi-access storage system as in claim 10 wherein the diverter has a normal position free of engagement with the articulated member wherein said material transport unit remains in its position on said rack and a power actuated position in operative engagement with the articulated member wherein said material transport unit is extracted from its position on said rack.

12. A multi-access storage system as in claim 10 wherein said power actuated member is a rotary solenoid means.

13. A multi-access storage system as in claim 10 wherein said power actuated member is a linearly actuating solenoid means.

14. A multi-access storage system as in claim 10 wherein there is a conveyor means for directing material transport units which are being unloaded away from the rack.

15. A multi-access storage system as in claim 1 wherein each said articulated member comprises an arm of resilient material having a captive end in anchored engagement with said conveyor rack and a free hooking end movable between positions of engagement with and disengagement from a particular shoulder of an associated material transport unit.

16. A multi-access storage system as in claim 1 wherein said disengagement means for the unloading assembly comprises camming means mounted on the conveyor rack at respective leading and trailing side locations of the conveyor engagement means, each camming means comprising a diverter portion having a first position in the path of travel of said conveyor engagement means for diverting the respective conveyor engagement means to positions free of engagement with said material transport unit and a second position clear of the path of travel, a connection betwee*n said camming means wherein said camming means act simultaneously, and motor means in the conveyor rack in operating engagement with said connection.

17. A multi-access storage system as in claim 16 wherein each said camming means comprises a camming bar having a pivotal mounting on the conveyor rack with a lever on one side of the mounting providing said diverter portion and a lever on the other side of the mounting responsive to engagement by said conveyor engagement means for returning said bar to a position wherein the diverter portion is out of the path of travel.

18. A multi-access storage system as in claim 16 wherein each said camming means comprises a camming bar having a pivotal mounting on the conveyor rack, a power lever on said camming bar, the connection between said camming means comprising an interconnecting member connecting said power levers.

19. A multi-access storage system as in claim 18 wherein said motor means has an extendable and retractable member in operating engagement with the power levers and said interconnecting member.

20. A multi-access storage system as in claim 18 wherein said motor means has an extendable and retractable member in operating engagement with the power levers and said interconnecting member and there is a yieldable means between opposite ends of said extendable and retractable member.

* * * * *

UNITED STATES PATENT AND TRADEMARK OFFICE
CERTIFICATE OF CORRECTION

PATENT NO. : 4,968,207
DATED : November 6, 1990
INVENTOR(S) : Robert D. Lichti

It is certified that error appears in the above—identified patent and that said Letters Patent is hereby corrected as shown below:

In Claim 1, column 10, line 30, the word "engagements" should be --engagement--

In Claim 1, column 10, line 43, the word "mountd" should be --mounted--

In Claim 3, column 10, line 58, the word "th" should be --the--

In Claim 9, column 11, line 25, the word "as" should be --a--

In Claim 16, column 12, line 25, "betwee*n" should be --between-- .

In Claim 16, column 12, line 27, the word "in" appearing first, should be --on--

Signed and Sealed this

Third Day of November, 1992

Attest:

DOUGLAS B. COMER

Attesting Officer

Acting Commissioner of Patents and Trademarks